(12) United States Patent
Takada

(10) Patent No.: US 11,733,802 B2
(45) Date of Patent: Aug. 22, 2023

(54) DISPLAY DEVICE

(71) Applicant: Japan Display Inc., Tokyo (JP)

(72) Inventor: Naoki Takada, Tokyo (JP)

(73) Assignee: Japn Display Inc., Tokyo (JP)

(*) Notice: Subject to any disclaimer, the term of this patent is extended or adjusted under 35 U.S.C. 154(b) by 209 days.

(21) Appl. No.: 17/239,043

(22) Filed: Apr. 23, 2021

(65) Prior Publication Data

US 2021/0240297 A1    Aug. 5, 2021

Related U.S. Application Data

(63) Continuation of application No. 16/567,016, filed on Sep. 11, 2019, now Pat. No. 11,016,604.

(30) Foreign Application Priority Data

Sep. 11, 2018  (JP) ................................ 2018-169808

(51) Int. Cl.
*G06F 3/044* (2006.01)
*G06F 3/041* (2006.01)

(52) U.S. Cl.
CPC .......... *G06F 3/0418* (2013.01); *G06F 3/0412* (2013.01); *G06F 3/0446* (2019.05); *G06F 2203/04107* (2013.01)

(58) Field of Classification Search
CPC .... G06F 3/0418; G06F 3/0412; G06F 3/0446; G06F 2203/04107; G06F 3/04164; G06F 3/04184; G06F 3/0445; G06F 3/0416; G06F 3/044; G06F 2203/04111
See application file for complete search history.

(56) References Cited

U.S. PATENT DOCUMENTS

| | | | |
|---|---|---|---|
| 2010/0073319 A1* | 3/2010 | Lyon | G06F 3/0445 345/174 |
| 2010/0156945 A1 | 6/2010 | Yoshida | |
| 2013/0016065 A1 | 1/2013 | Reynolds | |

(Continued)

FOREIGN PATENT DOCUMENTS

| | | |
|---|---|---|
| JP | 2017-059147 A | 3/2017 |
| JP | 2017-138782 A | 8/2017 |

OTHER PUBLICATIONS

Office Action dated May 10, 2022, in corresponding Japanese Patent Application No. 2018-169808 (English Translation only), 3 pages.

*Primary Examiner* — Temesghen Ghebretinsae
*Assistant Examiner* — Sosina Abebe
(74) *Attorney, Agent, or Firm* — Maier & Maier, PLLC

(57) ABSTRACT

According to one embodiment, a display device includes a plurality of first electrodes overlap a display area, extend in a first direction, and are arranged in a second direction, a plurality of second electrodes overlap the display area, extend in the second direction, and are arranged in the first direction, a plurality of conductive lines are provided along the first electrodes, and connected to the second electrodes, respectively, and a touch detection driver is configured to detect contact or approach of an object with respect to the display area. In a case where a distance between a conductive line and one of the first electrodes near the conductive line is less than a predetermined value, a shielding portion is formed in the second electrode.

12 Claims, 11 Drawing Sheets

(56) References Cited

U.S. PATENT DOCUMENTS

| | | | |
|---|---|---|---|
| 2015/0268795 A1* | 9/2015 | Kurasawa | G06F 3/0445 |
| | | | 345/174 |
| 2016/0239131 A1* | 8/2016 | Kang | G06F 3/0446 |
| 2017/0010728 A1 | 1/2017 | Kurasawa et al. | |
| 2017/0083137 A1 | 3/2017 | Kurasawa et al. | |
| 2017/0220163 A1 | 8/2017 | Kurasawa et al. | |
| 2017/0228076 A1* | 8/2017 | Abe | G06F 3/0445 |
| 2017/0288002 A1 | 10/2017 | Kim | |
| 2019/0353953 A1 | 11/2019 | Nieh | |
| 2019/0369787 A1* | 12/2019 | Park | G06F 3/0412 |
| 2020/0012364 A1* | 1/2020 | Ye | G06F 1/1637 |

\* cited by examiner

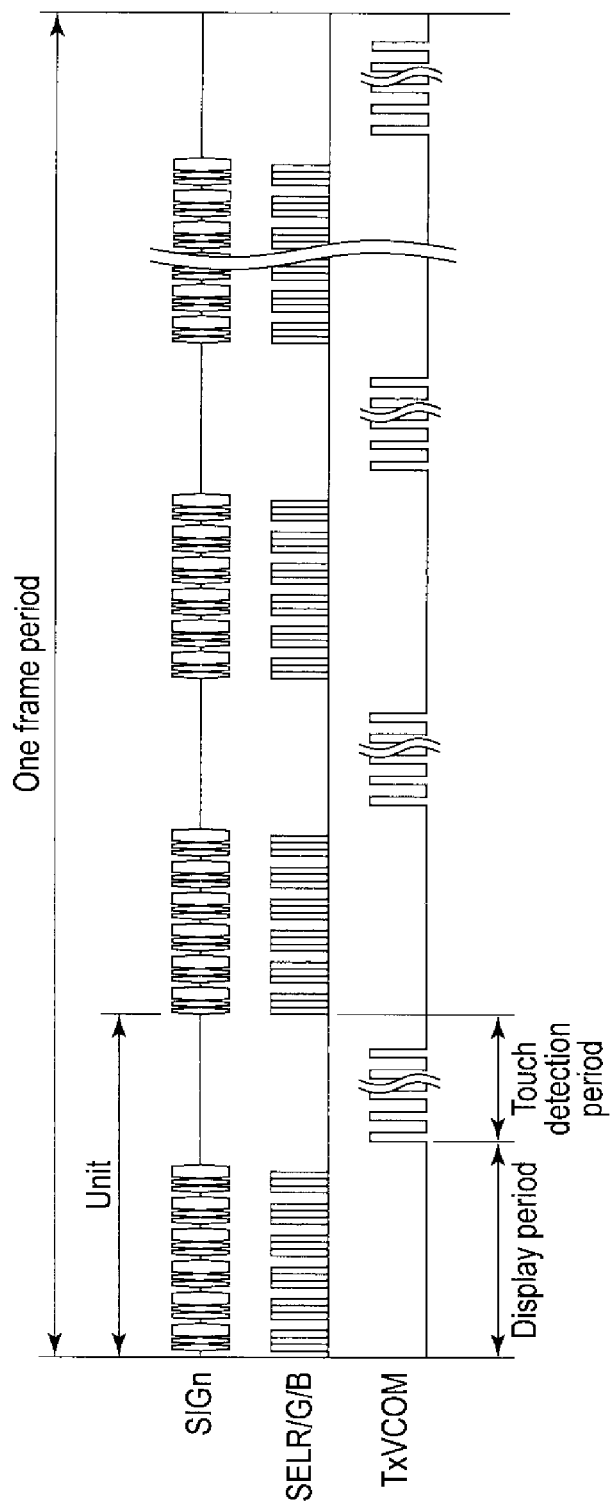
F I G. 5

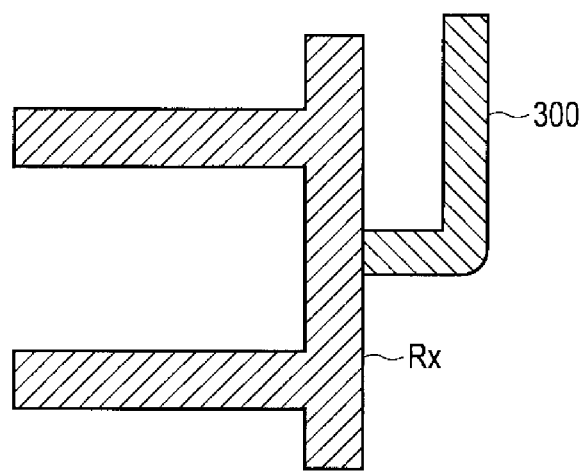
F I G. 7
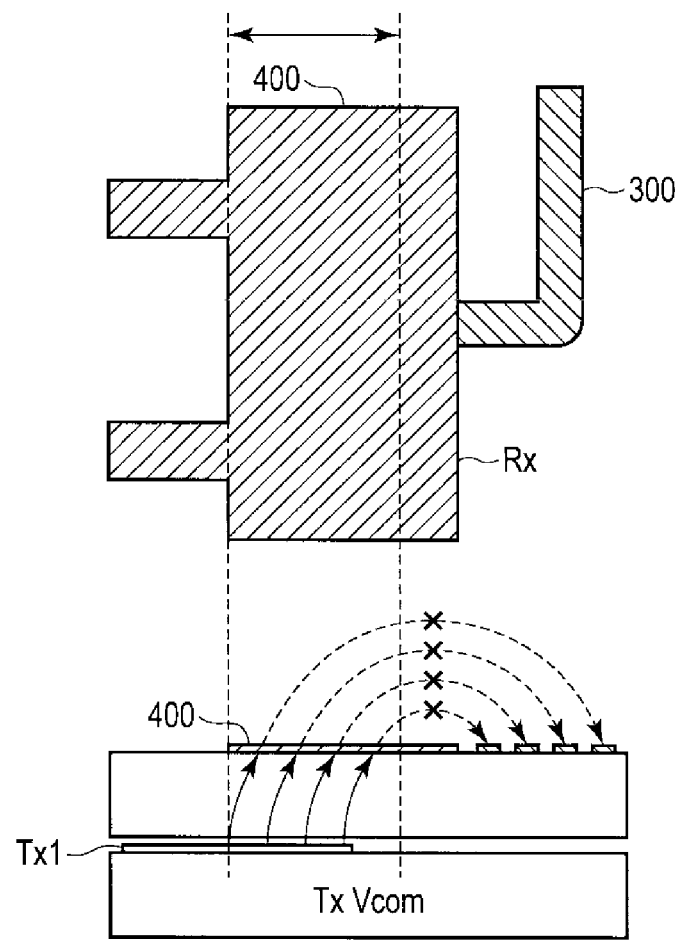
F I G. 8

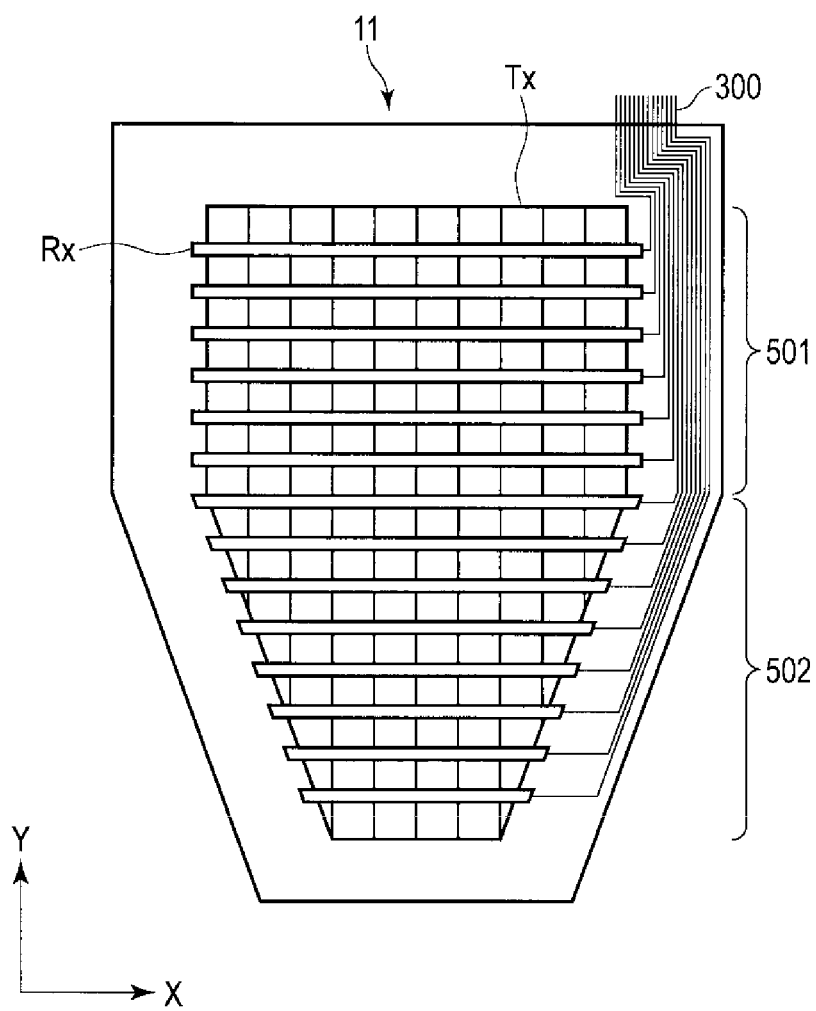
F I G. 9

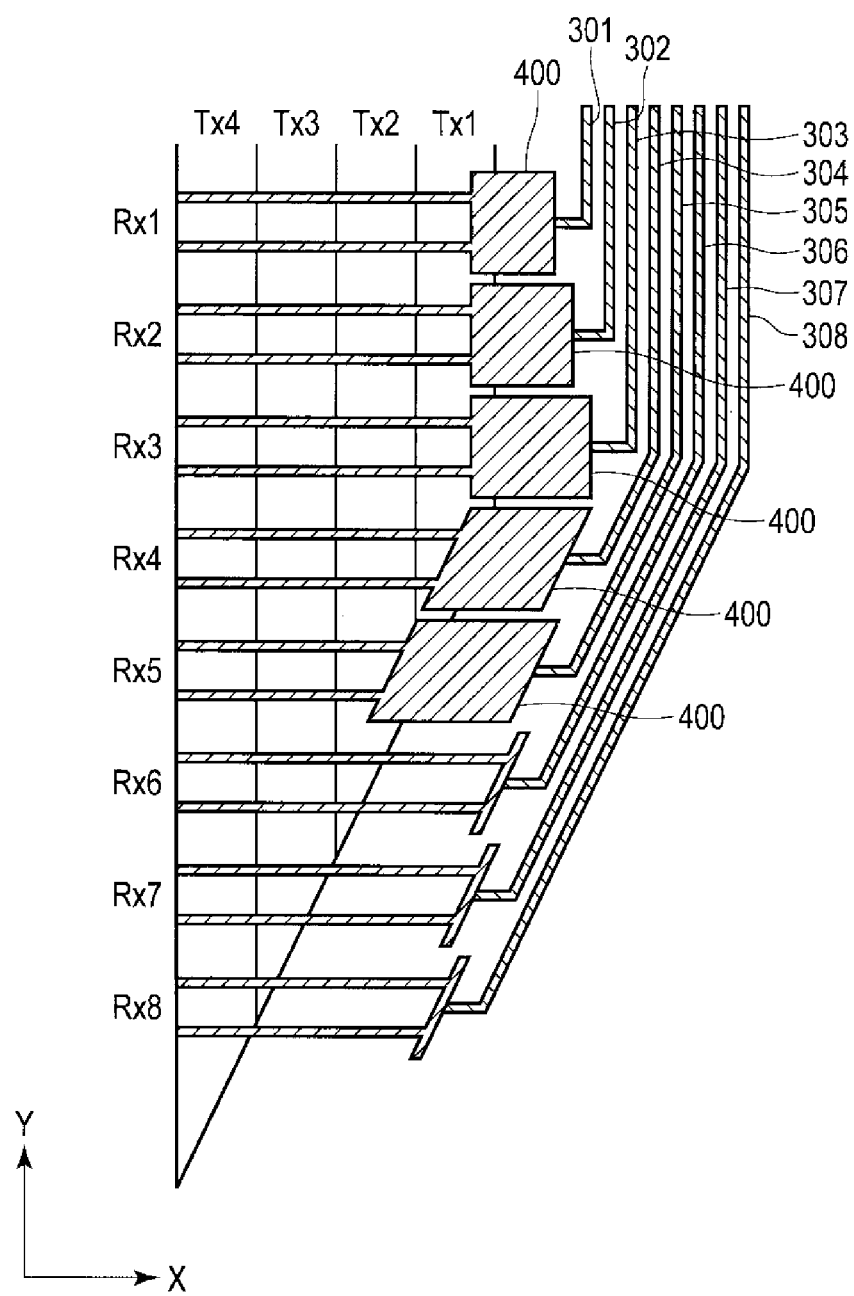
F I G. 10

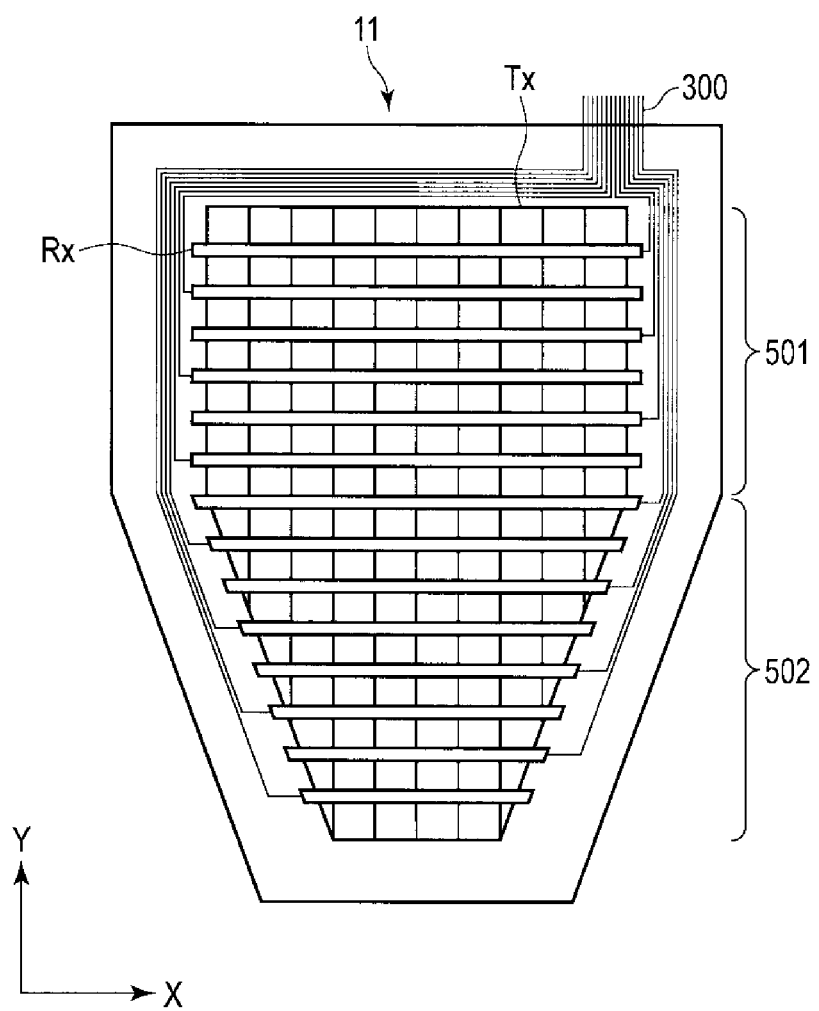
F I G. 11

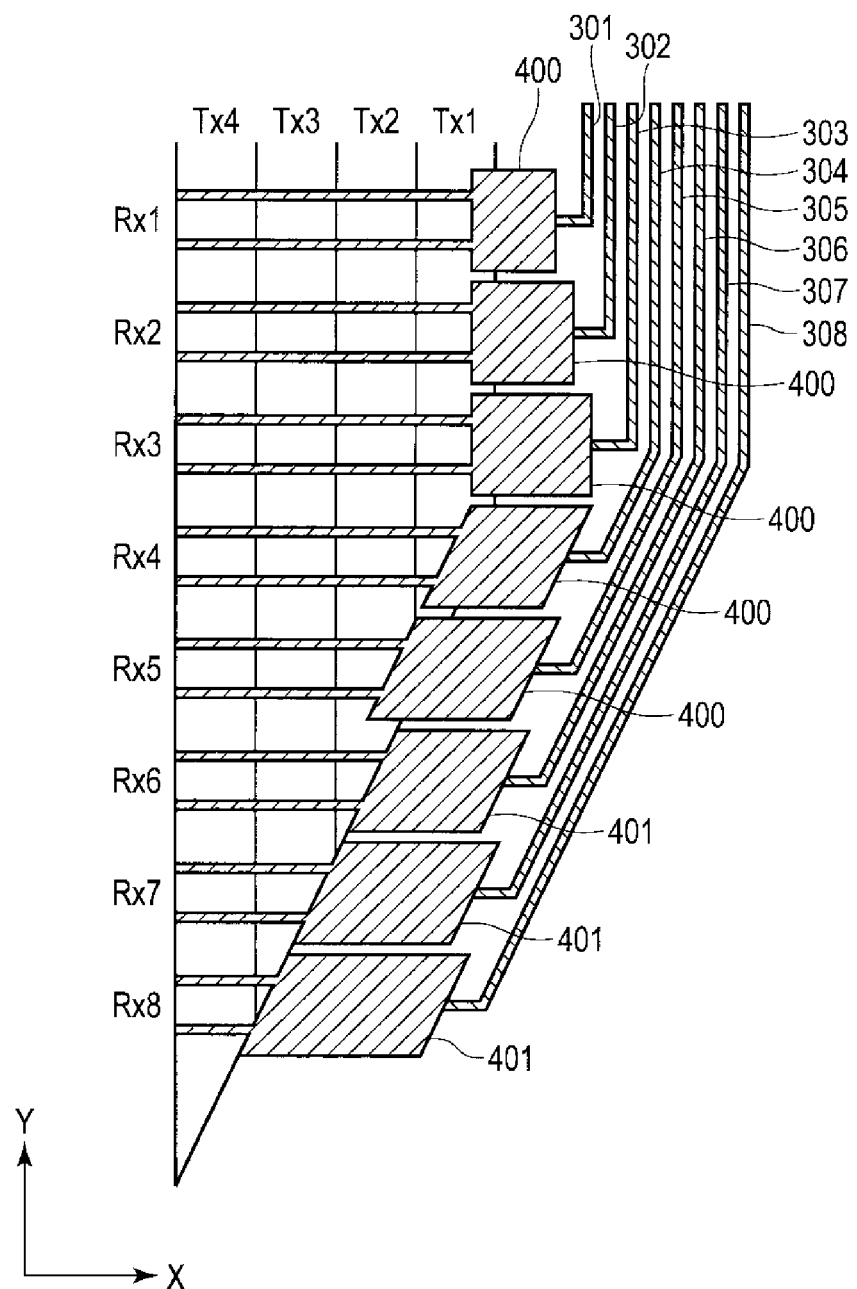
F I G. 12

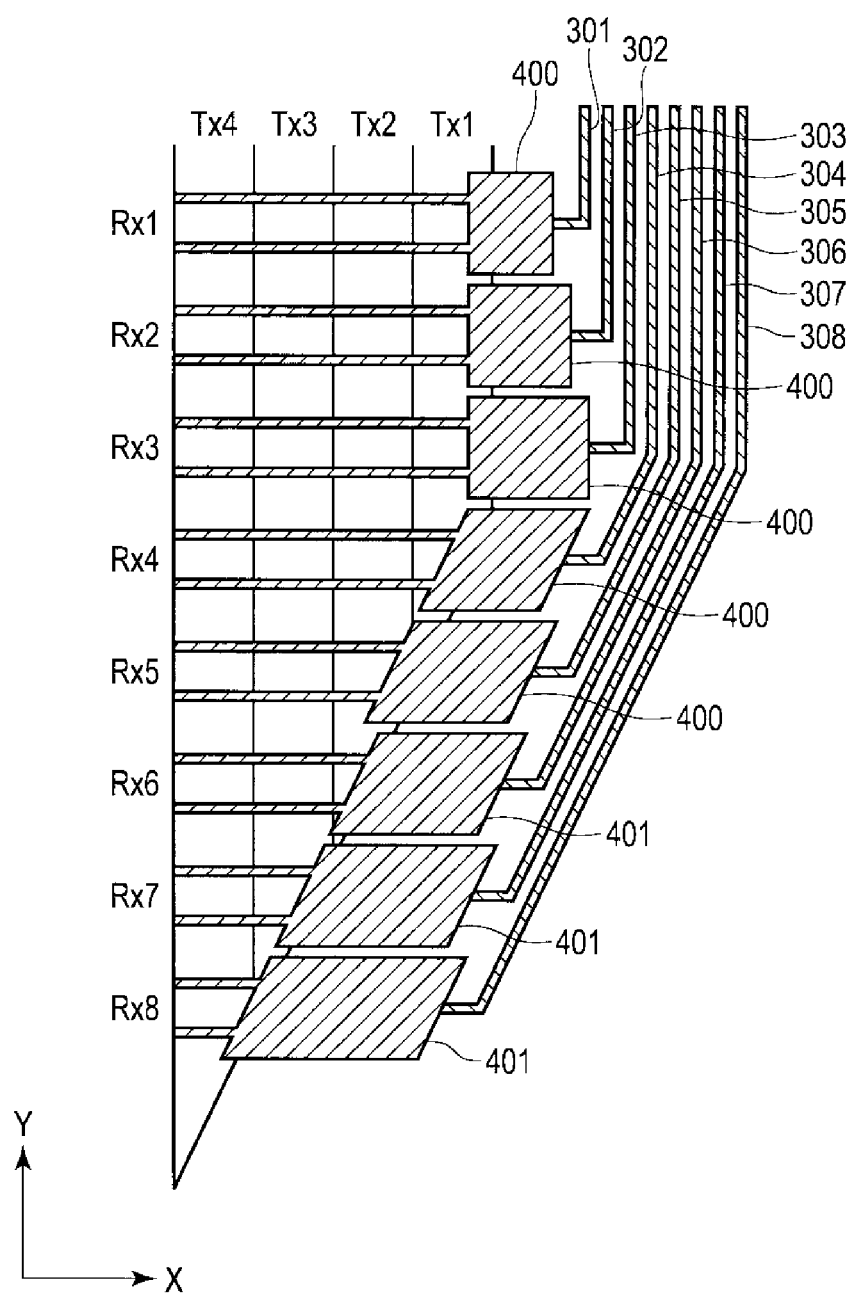
F I G. 13

DISPLAY DEVICE

CROSS-REFERENCE TO RELATED APPLICATIONS

This application is a continuation of U.S. application Ser. No. 16/567,016 filed Sep. 11, 2019. U.S. application Ser. No. 16/567,016 is based upon and claims the benefit of priority from Japanese Patent Application No. 2018-169808, filed Sep. 11, 2018, the entire contents of which are incorporated herein by reference.

FIELD

Embodiments described herein relate generally to a display device.

BACKGROUND

Recently, electronic devices such as smartphones and tablet computers have been widespread. In these electronic devices, a display device including a touch detection function (hereinafter, a display device with a touch detection function) has been adopted.

This display device with a touch detection function enables the detection of, for example, the contact or approach of an object such as a fingertip or stylus (external adjacent object) with respect to a display area (active area).

The touch detection function is realized by providing a drive electrode and a touch detection electrode. It is known that parasitic capacitance is generated between the drive electrode and the conductive line connected to the touch detection electrode.

As the parasitic capacitance affects the accuracy of touch detection, for example, a shielding portion (shield pattern electrode) is formed to prevent the generation of parasitic capacitance.

However, even if a structure of preventing the generation of parasitic capacitance is adopted, the accuracy of touch detection may be degraded.

BRIEF DESCRIPTION OF THE DRAWINGS

FIG. 5 is shown for explaining an example of the relationship between a display period and a touch detection period in the display device.

FIG. 7 shows an example of the connection portion of a touch detection electrode and a conductive line.

FIG. 8 is shown for explaining a shielding portion formed in the touch detection electrode.

FIG. 9 schematically shows an example of the positional relationship between the drive electrodes and the touch detection electrodes in the present embodiment.

FIG. 10 is shown for specifically explaining the shielding portions formed in the touch detection electrodes.

FIG. 11 shows a different layout example of the conductive lines connected to the touch detection electrodes.

FIG. 12 is shown for explaining the shielding portions formed in touch detection electrodes according to a second embodiment.

FIG. 13 is shown for explaining a structure in which the shielding portions are formed at positions overlapping the drive electrodes.

DETAILED DESCRIPTION

Figure 1:
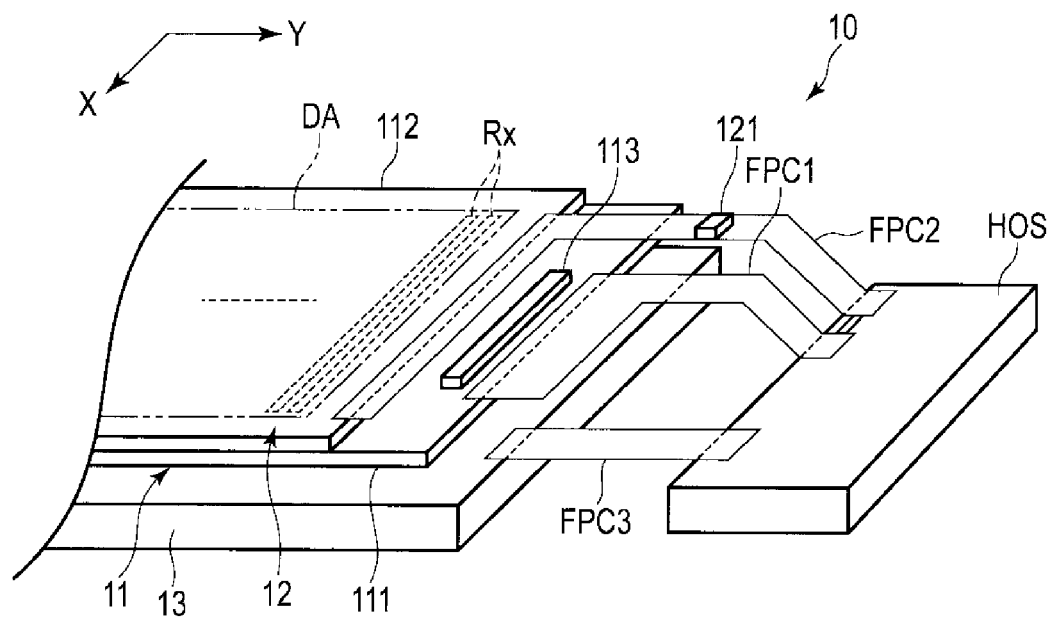
FIG. 1 is a perspective view showing an example of the general structure of a display device according to a first embodiment.

In general, according to one embodiment, a display device for displaying an image in a display area is provided. The display device includes a plurality of first electrodes overlapping the display area, extending in a first direction and arranged in a second direction intersecting the first direction, a plurality of second electrodes overlapping the display area, extending in the second direction and arranged in the first direction, a plurality of conductive lines provided along the first electrodes and connected to the second electrodes, respectively, and a touch detection driver connected to the conductive lines and detecting contact or approach of an object with respect to the display area based on capacitance between the first electrodes and the second electrodes. In a case where a distance between a conductive line near one of the second electrodes and one of the first electrodes near the conductive line is less than a predetermined value, a shielding portion is formed in the second electrode. In a case where a distance between a conductive line near one of the second electrodes and one of the first electrodes near the conductive line is greater than a predetermined value, the shielding portion is not formed in the second electrode.

Various embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings show schematic illustration rather than as an accurate representation of what is implemented. However, such schematic illustration is merely exemplary, and in no way restricts the interpretation of the invention. In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, redundant detailed description thereof being omitted unless necessary.

First Embodiment

Now, this specification explains a first embodiment. FIG. 1 is a perspective view showing the general structure of a display device according to the present embodiment. The display device of the present embodiment is a display device including a touch detection function. This type of display device may be a display device including an on-cell touch detection mechanism, in which a touch panel is formed on the display surface of the display device. Moreover, the display device may be a display device including an in-cell touch detection mechanism, in which a common electrode for image display originally provided in the display device is also used as one of a pair of electrodes for touch detection, and the other electrode (touch detection electrode) is provided to intersect the common electrode. Hereinafter, this specification explains the display device of the present embodiment, assuming that the display device includes an in-cell touch detection mechanism.

The display device 10 shown in FIG. 1 includes a display panel 11. As the display panel 11, for example, a display panel using a liquid crystal layer as a display function layer or a display panel using an organic emitting layer (organic electroluminescence) is used. Here, this specification explains a display panel using a liquid crystal layer.

The display panel 11 includes a first substrate (array substrate) 111, a second substrate (counter-substrate) 112 facing the first substrate 111, and a liquid crystal layer (not shown) formed between the first substrate 111 and the second substrate 112. For example, a panel driver (liquid crystal driver) 113 which drives the display panel 11 is mounted on the first substrate 111. The panel driver 113 drives the display panel 11 such that an image is displayed in the display area (active area) DA of the display panel 11.

The display panel 11 is integrally structured with, for example, a capacitive change detection type of touch detection mechanism 12.

The touch detection mechanism 12 includes a plurality of touch detection electrodes (second electrodes) Rx. The touch detection electrodes Rx are provided at a position overlapping the display area DA of the display panel 11 on the second substrate 112. The touch detection electrodes Rx extend in an X-direction (second direction) and are arranged in a Y-direction (first direction). Each touch detection electrode Rx is, for example, a transparent electrode and is formed of a transparent conductive material such as indium tin oxide (ITO) or indium zinc oxide (IZO). The touch detection electrodes Rx may be provided either outside or inside the display panel 11. The touch detection mechanism 12 is connected to a touch detection driver 121 via flexible printed circuit FPC2.

Although not shown in FIG. 1, a plurality of common electrodes (first electrodes) for image display as described above are provided on the first substrate 111 in the display panel 11. In the present embodiment, the common electrodes are used as one of the electrodes for touch detection, and are provided at positions facing the touch detection electrodes Rx. The common electrodes are formed of, for example, ITO.

In the display device 10 of the present embodiment, it is possible to detect the contact or approach of an object (detected object) with respect to the display area DA based on capacitance (mutual capacitance) between the touch detection electrodes Rx and the common electrodes. Although the display device 10 enables the detection of contact or approach of an object, in the following description, this specification explains that the display device 10 merely detects the contact of an object for descriptive purpose.

For example, a host device HOS is provided outside the display panel 11. The host device HOS is connected to the display panel 11 via flexible printed circuit FPC1 and the panel driver 113. The host device HOS is connected to the touch detection mechanism 12 via flexible printed circuit FPC2 and the touch detection driver 121.

It should be noted that the panel driver 113 and the touch detection driver 121 may be structures as the same chip. When the touch detection driver 121 and the panel driver 113 are the same chip, by providing the chip on, for example, the second substrate 112, flexible printed circuit FPC1 or flexible printed circuit FPC2, flexible printed circuit FPC1, flexible printed circuit FPC2, etc., may be omitted.

A backlight unit 13 is provided on the lower side of the first substrate 111 (in other words, the rear side of the display panel 11) as an illumination device which illuminates the display panel 11. Flexible printed circuit FPC3 connects the backlight unit 13 and the host device HOS. Various forms may be applied to the backlight unit 13. As a light source, for example, a light-emitting diode (LED) or a cold cathode fluorescent lamp (CCFL) is used. In the above description, this specification explains a case where the backlight unit 13 provided on the rear side of the display panel 11 is used. However, a front-light unit provided on the display side of the display panel 11 may be used. An illumination device using a light guide and an LED or a CCFL provided on a side of the light guide may be used. An illumination device using a point source in which emitting elements are arranged in a planer manner may be used. When the display device 10 is a reflective display device, or the display panel 11 uses organic electroluminescence, the display device 10 may not include an illumination device.

The display panel 11 of the present embodiment may be a transmissive display panel, a reflective display panel or a transflective display panel. The display device 10 to which a transmissive display panel 11 is applied includes, as described above, the backlight unit 13 on the rear side of the first substrate 111 and includes a transmissive display function for displaying an image by selectively transmitting the light emitted from the backlight unit 13. The display device 10 to which a reflective display panel 11 is applied includes a reflective layer which reflects light on the rear side of the display panel 11 in comparison with the liquid crystal layer, and includes a reflective display function for displaying an image by selectively reflecting light from the front side (display side) of the second substrate 112. An auxiliary light source may be provided on the front side of the reflective display panel 11. The reflective layer may be structured to form the electrodes provided on the rear side of the display panel 11 in comparison with the reflective layer by a material having a reflective function, such as metal. The display device 10 to which a transflective display panel 11 is applied includes the above transmissive display function and the above reflective display function.

Figure 2:
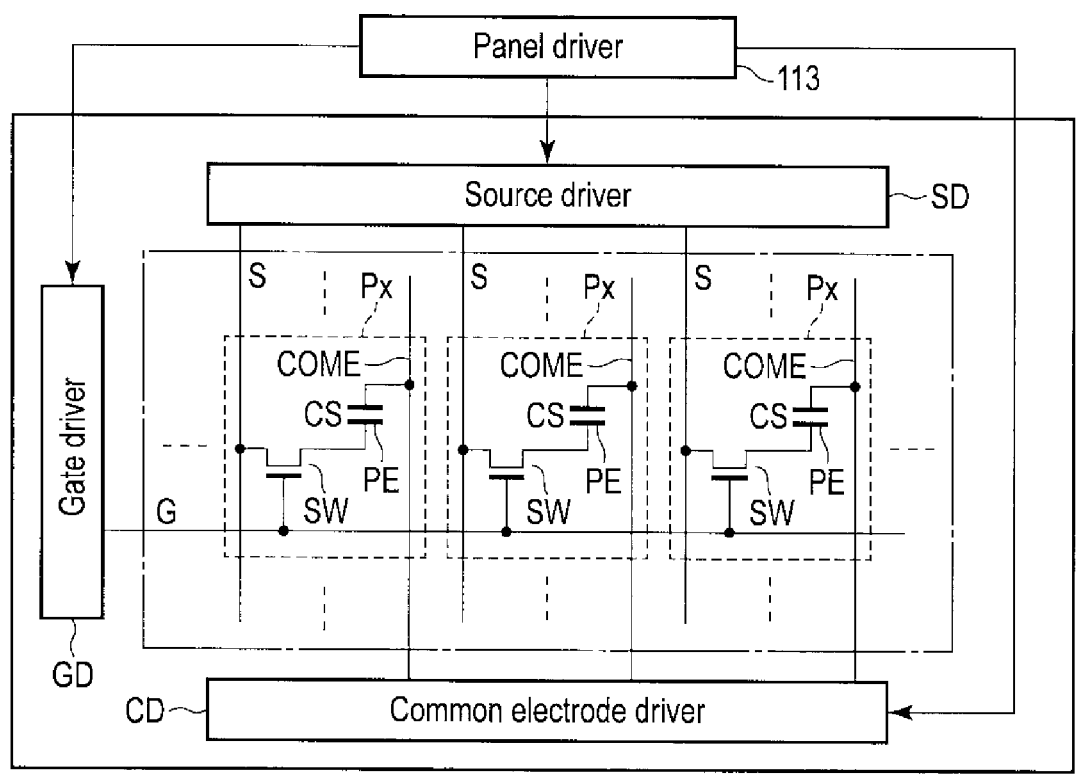
FIG. 2 shows an example of the general structure of a display panel provided in the display device.

FIG. 2 shows the general structure of the display panel 11 provided in the display device 10. A plurality of pixels PX are arranged in matrix in the display panel 11. For descriptive purpose, FIG. 2 shows only three pixels PX.

Each of the pixels PX includes a pixel switch SW. The pixel switches SW include a thin-film transistor (TFT), and are provided near the intersections of scanning lines G extending along the rows in which the pixels PX are arrayed and signal lines S extending along the columns in which the pixels PX are arrayed.

The gate electrode of each pixel switch SW is electrically connected to a corresponding scanning line G. The source electrode of each pixel switch SW is electrically connected to a corresponding signal line S. The drain electrode of each pixel switch SW is electrically connected to a corresponding pixel electrode PE. The source electrode of each pixel switch SW may be connected to a corresponding pixel electrode PE, and the drain electrode of each pixel switch SW may be connected to a corresponding signal line S.

A gate driver GD and a source driver SD are provided in the display panel 11 to drive a plurality of pixels PX. The scanning lines G are electrically connected to the output terminals of the gate driver GD. The signal lines S are electrically connected to the output terminals of the source driver SD.

The gate driver GD sequentially applies on-voltage to the scanning lines G and applies on-voltage to the gate electrodes of the pixel switches SW electrically connected to the selected scanning lines G. In each pixel switch SW in which on-voltage is applied to the gate electrode, the source electrode and the drain electrode of the pixel switch SW become electrically conductive.

The source driver SD supplies an output signal corresponding to each signal line S. The signal supplied to each signal line S is applied to a corresponding pixel electrode PE via a pixel switch SW in which the source electrode and the drain electrode is electrically conductive.

The display panel 11 further includes a common electrode driver CD. The common electrode driver CD is a circuit which supplies a drive signal (in other words, applies drive voltage) to the common electrodes COME. The pixel electrodes PE face the common electrodes COME via an insulating film. The pixel electrodes PE, the common electrodes COME and the insulating film form storage capacitance CS.

The gate driver GD, the source driver SD and the common electrode driver CD are provided in an area (frame) around the display panel 11, and are controlled by the panel driver 113. Although not shown in FIG. 2, the panel driver 113 controls the operation of the backlight unit 13.

In the display device 10, the panel driver 113 controls the gate driver GD, the source driver SD, the common electrode driver CD, the backlight unit 13, etc., to display an image in the display area DA.

FIG. 2 shows only a single gate driver GD. However, the display panel 11 may include a plurality of gate drivers GD. For example, when the display panel 11 includes two gate drivers GD, some of the scanning lines G are connected to one of the gate drivers GD, and the other scanning lines are connected to the other gate driver. In this case, for example, the two gate drivers are provided to face each other across the intervening pixels PX.

Figure 3:
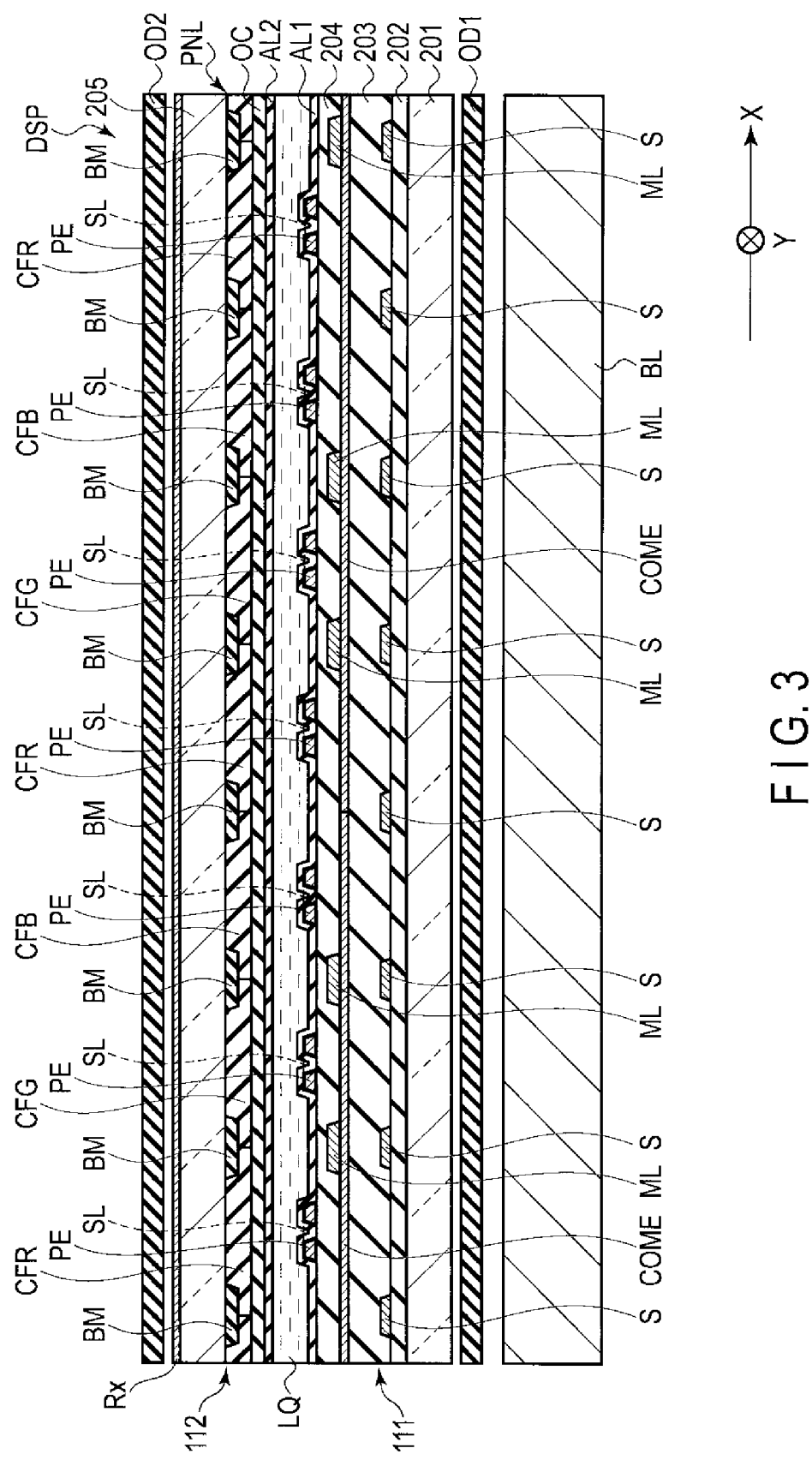
FIG. 3 schematically shows an example of the cross-sectional structure of the display device.

FIG. 3 is a figure (cross-sectional view) schematically showing the cross-sectional structure of the display device 10. FIG. 3 shows only a part of the cross-sectional structure of the display device 10 for descriptive purpose.

The display device 10 includes the display panel 11, the backlight unit 13, a first optical element OD1 and a second optical element OD2.

In FIG. 3, the display panel 11 includes a structure corresponding to a fringe field switching (FFS) mode as a display mode. However, the display panel 11 may include a structure corresponding to another display mode.

The display panel 11 includes the first substrate 111, the second substrate 112 and the liquid crystal layer LQ as described above. The first substrate 111 and the second substrate 112 are attached to each other in a state where a predetermined cell gap is formed. The liquid crystal layer LQ is held in the cell gap between the first substrate 111 and the second substrate 112.

The first substrate 111 is formed using a first insulating substrate 201 having a light transmitting property, such as a glass substrate or a resinous substrate. The first substrate 111 includes the signal lines S, the common electrodes COME, the pixel electrodes PE, a first insulating film 202, a second insulating film 203, a third insulating film 204, a first alignment film AL1, etc., on the side of the first insulating substrate 201 facing the second substrate 112.

The pixel electrodes PE and the common electrodes COME structure pixels PX together with the pixel area of the liquid crystal layer LQ. The pixels PX are arranged in matrix in the display panel 11 as described above.

The first insulating film 202 is provided on the first insulating substrate 201. The signal lines S are formed on the first insulating film 202. In the example shown in FIG. 3, the signal lines S extend in the Y-direction.

Although not shown in the figure, for example, the scanning lines G, the gate electrodes of the switching elements (pixel switches SW) and a semiconductor layer are provided between the first insulating substrate 201 and the first insulating film 202. Further, for example, the source electrodes and the drain electrodes of the switching elements are formed on the first insulating film 202.

The second insulating film 203 is provided on the signal lines S and the first insulating film 202. The common electrodes COME are formed on the second insulating film 203. The common electrodes COME includes a plurality of segments. The segments of the common electrodes COME extend in the Y-direction (first direction) and are arranged at predetermined intervals in the X-direction (second direction). The common electrodes COME are formed of a transparent conductive material such as ITO or IZO. In the example shown in FIG. 3, a metal layer ML is formed on the common electrodes COME such that the resistance of the common electrodes COME is made low. The metal layer ML may be omitted.

The third insulating film 204 is provided on the common electrodes COME and the second insulating film 203. The pixel electrodes PE are formed on the third insulating film 204. Each pixel electrode PE is located between adjacent signal lines S and faces the common electrodes COME. Each pixel electrode PE includes a slit SL at a position facing the common electrodes COME. Each pixel electrode PE is formed of a transparent conductive material such as ITO or IZO. The first alignment film AL1 covers the pixel electrodes PE and the third insulating film 204.

The second substrate 112 is formed using a second insulating substrate 205 having a light transmitting property, such as a glass substrate or a resinous substrate. The second substrate 112 includes a black matrix BM, color filters CFR, CFG and CFB, an overcoat layer OC, a second alignment film AL2, etc., on the side of the second insulating substrate 205 facing the first substrate 111.

The black matrix BM is formed on the internal surface of the second insulating substrate 205 and defines each pixel. Color filters CFR, CFG and CFB are formed on the internal surface of the second insulating substrate 205 and partially overlap the black matrix BM. Color filter CFR is a red color filter. Color filter CFG is a green color filter. Color filter CFB is a blue color filter. The overcoat layer OC covers color filters CFR, CFG and CFB. The overcoat layer OC is formed of a transparent resinous material. The second alignment film AL2 covers the overcoat layer.

The color filters, the black matrix, etc., may be formed on the first insulating substrate 201. The color filters may be stacked on, for example, the pixel electrodes PE.

The touch detection electrodes Rx are formed on the external surface of the second insulating substrate 205. The touch detection electrodes Rx are provided so as to extend in the X-direction. Although not shown in FIG. 3, the touch detection electrodes Rx are arranged in the Y-direction.

Each touch detection electrode Rx is formed of a transparent conductive material such as ITO or IZO as described above. However, for example, each touch detection electrode Rx may be formed of a metal material such as aluminum (Al), titanium (Ti), silver (Ag), molybdenum (Mo), tungsten (W), copper (Cu) or chromium (Cr), an alloy prepared by combining these metal materials, a conductive organic material or a dispersing element of fine conductive substances. Each touch detection electrode Rx may be a single-layer body formed of the above materials or a stacked layer body. As an example of the stacked layer body, each touch detection electrode Rx has a thin metal wire formed of the above metal materials and a transparent conductive material. When a metal material is used for each touch detection electrode Rx, mesh processing may be applied. Treatment for invisibility, such as plate processing with a black material, should be preferably applied.

The backlight unit 13 is provided on the rear side of the display panel 11 as described above. The first optical element OD1 is provided between the first insulating substrate 201 and the backlight unit 13. The second optical element OD2 is provided on the touch detection electrodes Rx. Each of the first optical element OD1 and the second optical element OD2 includes at least a polarizer. The first optical element OD1 and the second optical element OD2 may include a retardation film depending on the need.

Figure 4:
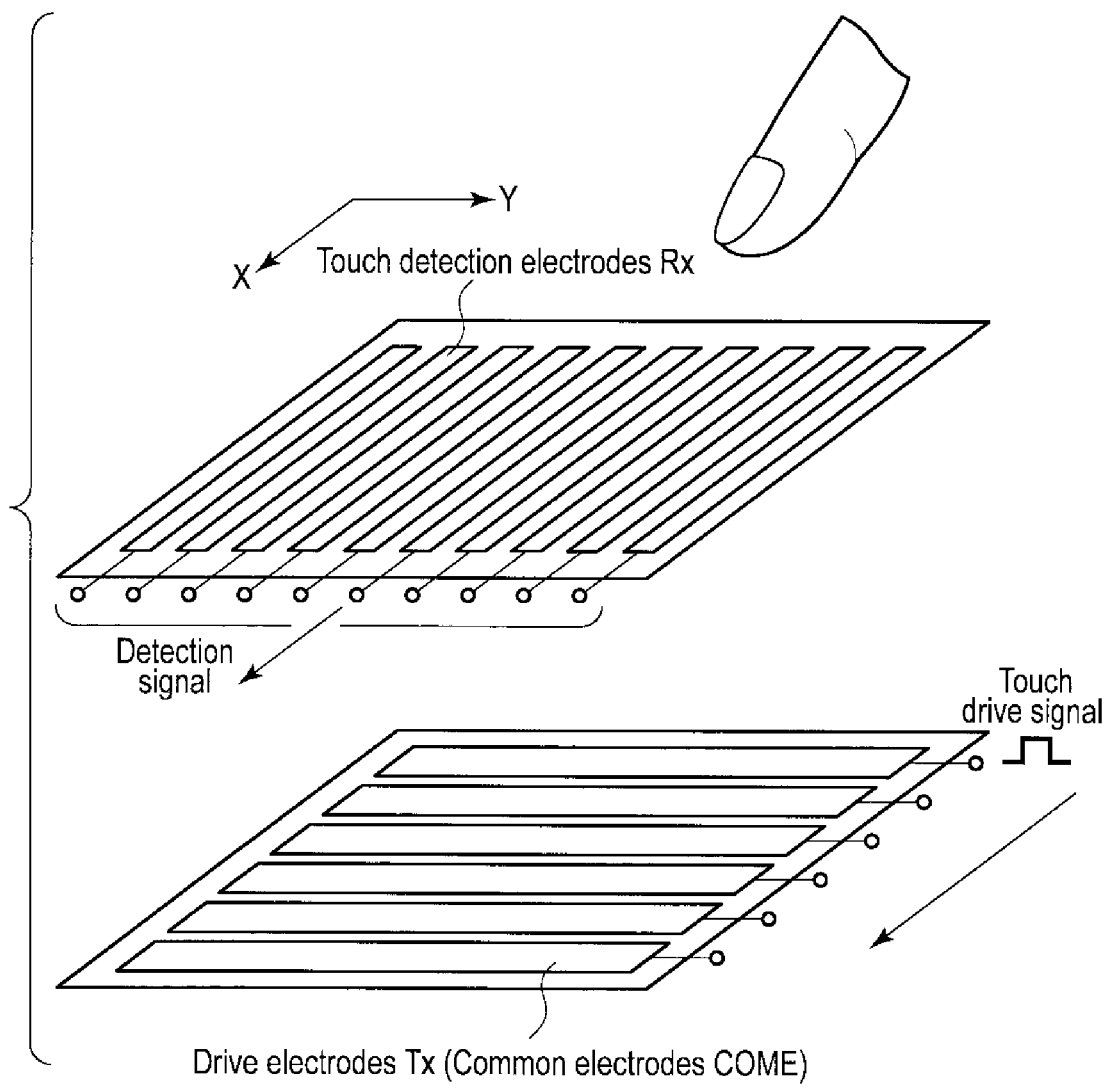
FIG. 4 is shown for explaining the basic operation of a touch detection mechanism.

FIG. 4 is shown for explaining the basic operation of the touch detection mechanism 12 described above. This specification explains the touch detection operation (in other words, the operation for detecting the contact of an object) by a mutual capacitance detection system.

In the touch detection mechanism 12 using the mutual capacitance detection system, a touch detection function is realized by, for example, the touch detection electrodes Rx formed into a stripe shape in the X-direction on the second substrate 112 and the drive electrodes Tx formed into a stripe shape in the Y-direction on the first substrate 111. As shown in FIG. 4, the touch detection electrodes Rx and the drive electrodes Tx intersect each other. As the drive electrodes Tx, the common electrodes COME for image display as described above are used.

It should be noted that the touch detection electrodes Rx may be formed into a stripe shape in the Y-direction and the drive electrodes Tx may be formed into a stripe shape in the X-direction.

In this structure, the drive electrodes Tx are driven by a drive signal (touch drive signal) of a radiofrequency pulse in series. In this case, a low-level signal (hereinafter, referred to as a touch detection signal) is detected from a touch detection electrode Rx which an object such as a fingertip approaches in comparison with the output from the other touch detection electrodes Rx. In addition to first capacitance generated between the touch detection electrode Rx which the fingertip approaches and the drive electrodes Tx, second capacitance is generated between the touch detection electrode Rx and the fingertip. The touch detection electrodes Rx are capable of outputting a touch detection signal based on the change in capacitance in response to a fingertip.

The touch detection mechanism 12 allows the determination of the coordinate position (contact position) of the fingertip from the driving timing of the drive electrodes Tx and the position of the touch detection electrode Rx which output the low-level detection signal.

FIG. 5 explains an example of the relationship between a display period and a touch detection period in the display device 10.

In the present embodiment, a display period includes a period for performing the display operation for displaying an image in the display area DA in the display panel 11 (in other words, the drive operation for the display pixels PX by the gate driver GD and the source driver SD). A touch detection period includes a period for performing the touch detection operation for detecting the contact of an object in the touch detection mechanism 12 (for example, the operation for supplying a touch drive signal to the drive electrodes Tx and detecting a touch detection signal).

As the drive electrodes Tx to which a touch drive signal is supplied in a touch detection period, as described above, a plurality of common electrodes COME having a strip shape are used. Since the common electrodes COME for displaying an image in the display area DA are also used as the drive electrodes Tx for touch detection, in the present embodiment, display operation and touch detection operation are performed by time-sharing.

Specifically, as shown in FIG. 5, a period for displaying an image of one frame by the above display operation (hereinafter, referred to as one frame period) includes a plurality of units. Each unit is divided into the above display period and touch detection period. In the period of each unit, after the operation (display operation) for outputting a pixel signal (SIGn) of a color corresponding to a signal (SELR/G/B) selecting one of the three colors of RGB is performed for a plurality of display lines (display period), the operation for supplying a touch drive signal (drive pulse TxVCOM) to the common electrodes COME as the drive electrodes Tx is performed (touch detection period). As stated above, one frame period includes a plurality of units. Thus, in one frame period, a display period and a touch detection period are alternately repeated.

Now, this specification specifically explains the structure of the display device 10 according to the present embodiment. Although not shown in FIG. 1, in the display device 10 of the present embodiment, the display area DA (display panel 11) is assumed to have an atypical shape. In the present embodiment, an atypical shape is a shape different from a rectangular shape such as substantially a square or substantially a non-square rectangle (that is, a shape other than a rectangular shape). In the following description, this specification explains a display device in which the display area DA has a rectangular shape as a comparison example of the present embodiment.

Figure 6:
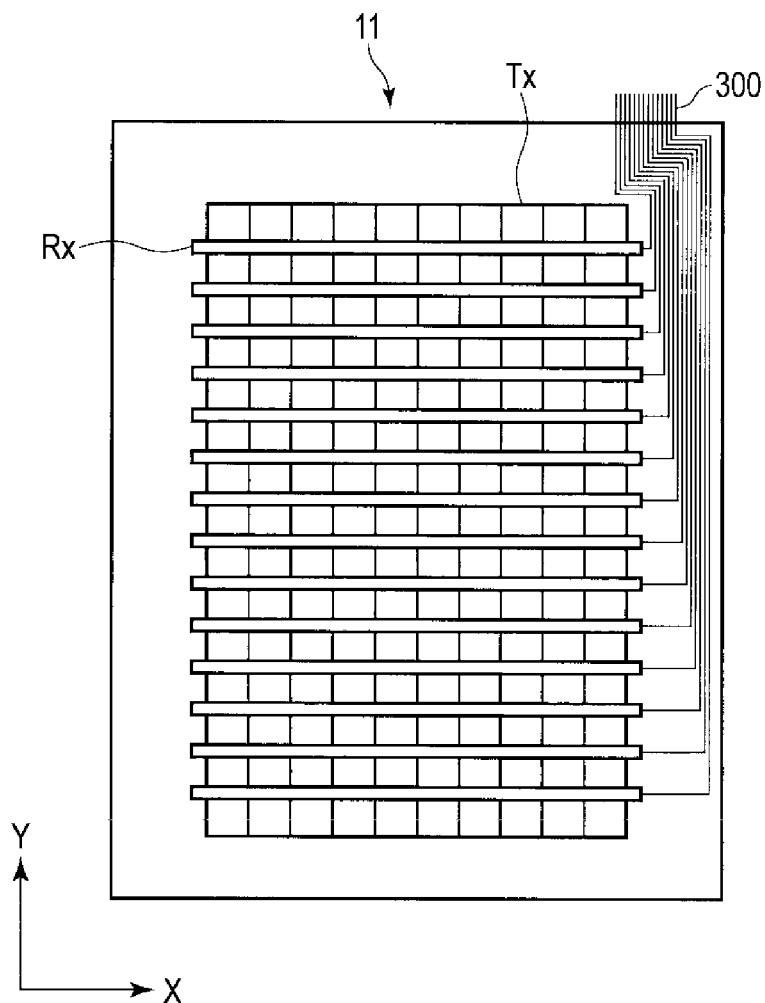
FIG. 6 schematically shows the positional relationship between drive electrodes and touch detection electrodes in a comparison example of the present embodiment.

FIG. 6 schematically shows the positional relationship between the drive electrodes Tx and the touch detection electrodes Rx in a comparison example of the present embodiment.

In the comparison example of the present embodiment, the drive electrodes Tx (common electrodes COME) are arranged in the X-direction so as to extend in the Y-direction. The touch detection electrodes Rx are arranged in the Y-direction so as to extend in the X-direction. The drive electrodes Tx and the touch detection electrodes Rx are provided at a position overlapping the rectangular display area DA.

In the display device of the comparison example of the present embodiment, as shown in FIG. 6, conductive lines (leads) 300 are connected to the touch detection electrodes Rx, respectively. Thus, the touch detection driver 121 is capable of receiving a touch detection signal from each touch detection electrode Rx via the conductive lines 300. The touch detection driver 121 is capable of detecting the contact of an object with respect to the display area DA based on this touch detection signal.

When the positional relationship between the drive electrodes Tx and the touch detection electrodes Rx are as shown in FIG. 6, the conductive lines 300 connected to the touch detection electrodes Rx, respectively, are provided along the drive electrodes Tx.

In this case, when a drive signal is supplied to, of the drive electrodes Tx, a drive electrode Tx (hereinafter, referred to as drive electrode Tx1) provided near the conductive lines 300 (in FIG. 6, at the right end), an electric field (fringing field) may be formed between drive electrode Tx1 and a conductive line 300. Thus, parasitic capacitance may be generated between drive electrode Tx1 and the conductive line 300. If parasitic capacitance is generated between drive electrode Tx1 and the conductive line 300, and a finger is in contact with the display area DA such that the hand is held over drive electrode Tx1 and the conductive line 300, a touch detection signal is output from the touch detection electrode Rx connected to the conductive line 300. This phenomenon is called a shadow effect. In this phenomenon, a touch detection signal is output from the touch detection electrode Rx provided at a position different from the contact position of the finger. Thus, the touch detection accuracy is decreased. Therefore, the generation of parasitic capacitance should be prevented.

FIG. 7 shows the connection portion of a touch detection electrode Rx and a conductive line 300. To prevent the generation of parasitic capacitance, for example, the shielding portion (shield pattern) 400 shown in the upper stage of FIG. 8 is formed in the base of the touch detection electrode Rx connected to the conductive line 300 as shown in FIG. 7. The shielding portion 400 is formed of a transparent conductive material such as ITO or IZO in a manner similar to that of the touch detection electrode Rx.

According to the shielding portion 400, the electric field formed between drive electrode Tx1 and the conductive line 300 when a drive signal (drive pulse TxVCOM) is supplied to drive electrode Tx1 can be blocked as shown in the lower stage of FIG. 8. Thus, the generation of parasitic capacitance can be prevented.

FIG. 9 schematically shows an example of the positional relationship between the drive electrodes Tx and the touch detection electrodes Rx in the present embodiment. In the example of FIG. 9, the display area DA having an atypical shape in the present embodiment includes a portion (hereinafter, referred to as a rectangular portion) 501 equivalent to a rectangular shape and a portion (hereinafter, referred to as an atypical portion) 502 equivalent to a trapezoidal shape.

In a manner similar to that of the above comparison example of the present embodiment, in the display area DA having an atypical shape, the drive electrodes Tx are arranged in the X-direction so as to extend in the Y-direction, and the touch detection electrodes Rx are arranged in the Y-direction so as to extend in the X-direction. The drive electrodes Tx and the touch detection electrodes Rx are provided at a position overlapping the display area DA having an atypical shape.

In the atypical portion 502, the capacitance of the drive electrodes Tx and the touch detection electrodes Rx (in other words, the area of the portion in which the drive electrodes Tx overlap the touch detection electrodes Rx) is less than that of the rectangular portion 501. Thus, in the atypical portion 502, the signal amount of the touch detection signal output from the touch detection electrodes Rx is reduced (the touch detection signal is lessened).

In the structure in which the display area DA has an atypical shape, when the above shielding portion 400 is formed to prevent the generation of parasitic capacitance, the signal amount of the touch detection signal is further reduced by the effect of the shielding portion 400.

In the structure in which the display area DA has an atypical shape as described above, even when the shielding portions 400 are formed in a plurality of touch detection electrodes Rx to prevent the generation of parasitic capacitance, the touch detection accuracy may be decreased.

The present embodiment adopts a structure in which, for example, the shielding portions 400 are formed in part of a plurality of touch detection electrodes Rx.

Now, this specification specifically explains the shielding portions 400 formed in the touch detection electrodes Rx in the present embodiment, with reference to FIG. 10.

FIG. 10 shows only part of the drive electrodes Tx and the touch detection electrodes Rx for convenience sake. The drive electrodes Tx arranged in the X-direction in FIG. 10 are defined as drive electrodes Tx1 to Tx4 in order from the side close to the conductive lines 300. The touch detection electrodes arranged in the Y-direction in FIG. 10 are defined as touch detection electrodes Rx1 to Rx8.

Of touch detection electrodes Rx1 to Rx8 shown in FIG. 10, touch detection electrodes Rx1 to Rx3 are the touch detection electrodes provided at a position overlapping the rectangular portion 501 described above, and touch detection electrodes Rx4 to Rx8 are the touch detection electrodes provided at a position overlapping the atypical portion 502 described above.

In the present embodiment, in a case where the distance between a conductive line 300 provided near one of the touch detection electrodes Rx and a drive electrode Tx (for example, drive electrode Tx1) provided near the conductive line 300 is less than a predetermined value, the shielding portion 400 is formed in the touch detection electrode Rx. The predetermined value is a value for determining that the distance between a conductive line 300 and a drive electrode Tx is less to the extent that an electric field is formed between the conductive line 300 and the drive electrode Tx to generate parasitic capacitance.

As shown in FIG. 10, the conductive lines 300 connected to touch detection electrodes R1 to R8 are defined as conductive lines 301 to 308, respectively. It is assumed that the distance between, of conductive lines 301 to 308, each of conductive lines 301 to 305 and a drive electrode Tx (for example, drive electrode Tx1) is less than a predetermined value.

In this case, the shielding portion 400 is formed in each of touch detection electrodes R1 to Rx5 provided near the respective conductive lines 301 to 305. The shielding portions 400 formed in touch detection electrodes Rx1 to Rx5 are capable of blocking an electric field formed between drive electrode Tx1 and conductive lines 301 to 305.

It is assumed that the distance between each of conductive lines 306 to 308 and drive electrode Tx1 is greater than a predetermined value. In this case, as shown in FIG. 10, the shielding portion 400 is not formed in each of touch detection electrodes Rx6 to Rx8 provided near the respective conductive lines 306 to 308. Conductive lines 306 to 308 and drive electrodes Tx2 to Tx4 are not arranged side by side. Further, the distance between each of conductive lines 306 to 308 and drive electrodes Tx2 to Tx4 is greater than or equal to a predetermined value. Thus, the effect of the parasitic capacitance generated between conductive lines 306 to 308 and drive electrodes Tx2 to Tx4 is less. Even in consideration of the positional relationship with drive electrodes Tx2 to Tx4, the shielding portion 400 is not formed in touch detection electrodes Rx6 to Rx8.

In the above description, the shielding portion 400 is formed in each of touch detection electrodes Rx1 to Rx5. For example, the distance between the shielding portion 400 formed in touch detection electrode Rx1 and the shielding portion 400 formed in touch detection electrode Rx2 adjacent to touch detection electrode Rx1 is assumed to be less than a predetermined value.

The size of the shielding portions 400 formed in touch detection electrodes Rx1 to Rx5 differs depending on the distance between conductive lines 301 to 305 and drive electrode Tx1. Specifically, for example, the size of the shielding portion 400 formed in touch detection electrode Rx1 is determined based on the distance between conductive line 301 connected to touch detection electrode Rx1 and drive electrode Tx1. For example, the size of the shielding portion 400 formed in touch detection electrode Rx2 is determined based on the distance between conductive line 302 connected to touch detection electrode Rx2 and drive electrode Tx1. In the above description, this specification explains only the shielding portions 400 formed in touch detection electrodes Rx1 and Rx2. However, the above explanation is also applied to the shielding portions 400 formed in touch detection electrodes Rx3 to Rx5.

For example, in a case where conductive lines 301 to 308 are located as shown in FIG. 10, the shielding portions 400 are formed such that the size is increased in the order of touch detection electrodes Rx1 to Rx5.

In the present embodiment, the shielding portions 400 formed in touch detection electrodes Rx1 to Rx5 are formed such that the area is as large as possible depending on the positional relationship with conductive lines 301 to 305.

As described above, the size of the shielding portions 400 formed in touch detection electrodes Rx1 to Rx5 differs depending on the distance to conductive lines 301 to 305 connected to touch detection electrodes Rx1 to Rx5. However, for example, the area of the portion in which the shielding portion 400 formed in touch detection electrode Rx1 overlaps drive electrode Tx1 is substantially equal to the area of the portion in which the shielding portion 400 formed in touch detection electrode Rx2 overlaps drive electrode Tx1. Similarly, the area of the portion in which the shielding portion 400 formed in touch detection electrode Rx2 overlaps drive electrode Tx1 is substantially equal to the area of the portion in which the shielding portion 400 formed in touch detection electrode Rx3 overlaps drive electrode Tx1. Thus, for example, in the rectangular portion 501, the areas of the portions in which the shielding portions 400 formed in the touch detection electrodes Rx overlap drive electrode Tx1 are structured to be substantially equal to each other.

As described above, in the present embodiment, in a case where the distance between a conductive line 300 provided near a touch detection electrode Rx (one of a plurality of second electrodes) and a drive electrode Tx (first electrode) provided near the conductive line 300 is less than a predetermined value, the shielding portion 400 is formed in the touch detection electrode Rx. In a case where the distance between a conductive line 300 provided near a touch detection electrode Rx and a drive electrode Tx provided near the conductive line 300 is greater than the predetermined value, the shielding portion 400 is not formed in the touch detection electrode Rx.

In the structure of the present embodiment, the electric field formed between drive electrode Tx1 and conductive lines 301 to 305 can be blocked by the shielding portions 400 formed in the above touch detection electrodes Rx1 to Rx5, thereby preventing the generation of parasitic capacitance between drive electrode Tx1 and conductive lines 301 to 305. Since the shielding portion 400 is not formed in touch detection electrodes Rx6 to Rx8, in touch detection electrodes Rx6 to Rx8, it is possible to avoid the reduction of the signal amount of touch detection signals caused by the shielding portion 400.

In the present embodiment, the shielding portion 400 is formed in each portion considerably affected by the parasitic capacitance generated between the conductive lines 300 and the drive electrodes Tx. On the other hand, the shielding portion 400 is not formed in each portion less affected by the parasitic capacitance generated between the conductive lines 300 and the drive electrodes Tx. In this way, the reduction of accuracy of touch detection can be prevented.

In the present embodiment, the distance between the shielding portion 400 formed in a touch detection electrode Rx (for example, touch detection electrode Rx1) and the shielding portion 400 formed in an adjacent touch detection electrode Rx (for example, touch detection electrode Rx2) may be less than a predetermined value. This structure can prevent the formation of an electric field between the shielding portions 400 formed in the touch detection electrodes Rx adjacent to each other. Thus, the generation of parasitic capacitance can be further prevented.

In the present embodiment, the size of the shielding portion 400 formed in each touch detection electrode Rx may differ depending on the distance between the conductive line 300 connected to the touch detection electrode Rx and a drive electrode Tx. In this structure, when the shielding portion 400 is formed in each touch detection electrode Rx so as to be as large as possible depending on the positional relationship with the conductive lines 300, the shielding effect by the shielding portion 400 can be improved, thereby further preventing the generation of parasitic capacitance.

In the present embodiment, the area of the portion in which the shielding portion 400 formed in a touch detection electrode Rx (for example, touch detection electrode Rx1) overlaps a drive electrode Tx (for example, drive electrode Tx1) may be substantially equal to the area of the portion in which the shielding portion 400 formed in each of other touch detection electrodes Rx (for example, touch detection electrodes Rx2 and Rx3) overlaps the drive electrode Tx. This structure can equalize, in each drive electrode Tx, the area of the portion which does not overlap the shielding portion 400 (in other words, the portion which is not covered with the shielding portion 400). Thus, it is possible to prevent the variation in the reduction of the signal amount caused by the shielding portions 400.

In the present embodiment, a plurality of common electrodes COME for displaying an image in the display area DA are used as a plurality of electrodes Tx for detecting the contact of an object. The display operation for displaying an image in the display area DA and the touch detection operation are performed by time-sharing. By this structure, the thickness of the display device 10 can be reduced, and further, the image quality can be improved.

In the above explanation of FIG. 10, the shielding portions 400 are formed in touch detection electrodes Rx1 to Rx5. However, the shielding portions 400 may be formed in the touch detection electrodes Rx (for example, touch detection electrodes Rx1 to Rx3) provided at a position overlapping the rectangular portion 501 structuring the display area DA, and the shielding portion 400 may not be formed in the touch detection electrodes Rx (for example, touch detection electrodes Rx4 to Rx8) provided at a position overlapping the atypical portion 502 structuring the display area DA.

When the right end of each touch detection electrode Rx extending in the X-direction in FIG. 9 is defined as a first end, and the left end is defined as a second end, the present embodiment is explained such that all the conductive lines 300 are connected to the first ends of the touch detection electrodes Rx. However, as shown in FIG. 11, for example, the conductive lines 300 may be connected to the first ends of the odd-numbered touch detection electrodes Rx, and the conductive lines 300 may be connected to the second ends of the even-numbered touch detection electrodes Rx. In the present embodiment, since all the conductive lines 300 are connected to the first ends of the touch detection electrodes Rx, the shielding portions 400 are formed in the bases of the touch detection electrodes Rx near the conductive lines 300. However, when the structure shown in FIG. 11 is adopted, the shielding portion 400 may be formed in the base of each touch detection electrode Rx or the leading end of each touch detection electrode Rx or both of them.

The present embodiment is explained, assuming that the display area DA (display panel 11) of the display device 10 has an atypical shape. The display device in which the display area DA has a rectangular shape is explained as a comparison example. However, the present embodiment may be applied to a case where the display area DA does not have an atypical shape (in other words, for example, the display area DA has a rectangular shape). In the present embodiment, the display area DA may not have an atypical shape as long as, as described above, the shielding portion 400 is formed in a touch detection electrode Rx in a case where the distance between a conductive line 300 provided near the touch detection electrode Rx and a drive electrode Tx provided near the conductive line 300 is less than a predetermined value, and the shielding portion 400 is not formed in the touch detection electrode Rx in a case where the distance is greater than the predetermined value.

In the present embodiment, this specification explains the display device 10 including the in-cell touch detection mechanism 12. However, for example, the present embodiment may be realized as a display device including an on-cell touch detection mechanism, or may be realized as a touch panel (touch sensor) for detecting the contact or approach of an object with respect to a predetermined area (touch detection area).

Second Embodiment

Now, this specification explains a second embodiment. In the following description, the same portions as those of the drawings used in the explanation of the first embodiment are denoted by like reference numbers, detailed description thereof being omitted. Only the portions different from those of the first embodiment are mainly explained.

The present embodiment is different from the first embodiment in respect that a shielding portion is formed in a touch detection electrode Rx even in a case where the distance between a conductive line 300 provided near the touch detection electrode Rx and a drive electrode Tx provided near the conductive line 300 is greater than a predetermined value.

In the above FIG. 10, with regard to the intersections of drive electrodes Tx2 to Tx4 and touch detection electrodes Rx6 to Rx8 provided at a position overlapping the atypical portion 502, as the area in which drive electrodes Tx2 to Tx4 overlaps touch detection electrodes Rx6 to Rx8, respectively, is small, the capacitance between the drive electrodes Tx and the touch detection electrodes Rx (Tx-Rx) is less.

For example, when an object such as a finger is in contact with the intersection of drive electrode Tx2 and touch detection electrode Rx6, a touch detection signal is output from touch detection electrode Rx6. The touch detection signal is input to an A/D converter (not shown) for detecting the contact of the object.

However, when the capacitance between drive electrode Tx2 and touch detection electrode Rx6 is less because of the shape of the atypical portion 502 as described above, the touch detection signal value output from touch detection electrode Rx6 may be less than the lower limit (minimum value) in the dynamic range of the A/D converter. Thus, the contact of the object may not be detected.

Here, this specification explains a case where an object is in contact with the intersection of drive electrode Tx2 and touch detection electrode Rx6. However, the same explanation is applied to a case where an object is in contact with the intersection of drive electrode Tx3 and touch detection electrode Rx7 and a case where an object is in contact with the intersection of drive electrode Tx4 and touch detection electrode Rx8.

In the present embodiment, as shown in FIG. 12, a shielding portion (second shielding portion) 401 is formed in each of touch detection electrodes Rx6 to Rx8. In this case, the shielding portions 401 are formed at positions which do not overlap drive electrodes Tx2 to Tx4. Each shielding portion 401 is formed of a transparent conductive material such as ITO or IZO in a manner similar to that of the above shielding portions 400.

According to the shielding portion 401 formed in touch detection electrode Rx6, the capacitance between drive electrode Tx2 and touch detection electrode Rx6 can be increased. According to the shielding portion 401 formed in touch detection electrode Rx7, the capacitance between drive electrode Tx3 and touch detection electrode Rx7 can be increased. According to the shielding portion 401 formed in touch detection electrode Rx8, the capacitance between drive electrode Tx4 and touch detection electrode Rx8 can be increased.

The size of the shielding portion 401 formed in each of touch detection electrodes Rx6 to Rx8 differs depending on the distance between conductive lines 306 to 308 and drive electrodes Tx2 to Tx4. In other words, in the present embodiment, the shielding portions 401 are formed in touch detection electrodes Rx6 to Rx8 such that the area is as large as possible depending on the positional relationship with conductive lines 306 to 308.

In the above description, this specification explains the shielding portions 401 formed in touch detection electrodes Rx6 to Rx8. As the shielding potions (first shielding portions) 400 formed in touch detection electrodes Rx1 to Rx5 are the same as those of the first embodiment, the detailed explanation thereof is omitted here.

As described above, in the present embodiment, in a case where the distance between a conductive line 300 provided near a touch detection electrode Rx and a drive electrode Tx provided near the conductive line 300 is greater than a predetermined value, the shielding portion (second shielding portion) 401 is formed in the touch detection electrode Rx.

In the structure of the present embodiment, the shielding portions 401 allow the capacitance between the drive electrodes Tx and the touch detection electrodes Rx in the atypical portion 502 to be increased. Thus, the variation in the capacitance between the drive electrodes Tx and the touch detection electrodes Rx in the plane of a display area DA (display panel 11) can be reduced. The accuracy of touch detection can be improved.

In the present embodiment, the shielding portions 401 are formed at positions which do not overlap the drive electrodes Tx (for example, drive electrodes Tx2 to Tx4). Thus, it is possible to avoid the reduction of the signal amount of touch detection signals caused by the shielding portions 401.

In the present embodiment, the size of the shielding portion 401 formed in a touch detection electrode Rx may differ depending on the distance between a conductive line 300 provided near the touch detection electrode Rx and a drive electrode Tx provided near the conductive line 300. In this structure, since the shielding portion 401 of each touch detection electrode Rx is formed so as to be as large as possible depending on the positional relationship with the conductive lines 300, the capacitance between the drive electrodes Tx and the touch detection electrodes Rx in the atypical portion 502 can be further increased.

In the above first embodiment, no shielding portion is formed in touch detection electrodes Rx6 to Rx8 since drive electrodes Rx2 to Tx4, etc., are less affected by the generation of parasitic capacitance. However, parasitic capacitance may be generated between conductive lines 306 to 308 and drive electrodes Tx2 to Tx4. Therefore, in the present embodiment, as shown in FIG. 13, for example, the shielding portions 401 may be formed at positions overlapping the drive electrodes Tx.

In this structure, the capacitance between the drive electrodes Tx and the touch detection electrodes Rx in the atypical portion 502 can be increased. Moreover, the generation of parasitic capacitance between the conductive lines 300 and the drive electrodes Tx may be prevented.

In this case, the area of the portion in which each shielding portion 401 overlaps the drive electrode Tx is made less than the area of the portion in which each shielding portion 400 overlaps the drive electrode Tx. Therefore, it is possible to prevent the reduction of the signal amount of touch detection signals caused by the shielding portions 401.

The invention according to the embodiments will be noted below.

[C1]
A display device for displaying an image in a display area, the display device comprising:
a plurality of first electrodes overlapping the display area, extending in a first direction, and arranged in a second direction intersecting the first direction;
a plurality of second electrodes overlapping the display area, extending in the second direction, and arranged in the first direction;
a plurality of conductive lines provided along the first electrodes, and connected to the second electrodes, respectively; and
a touch detection driver connected to the conductive lines, and detecting contact or approach of an object with respect to the display area based on capacitance between the first electrodes and the second electrodes, wherein
in a case where a distance between a conductive line near one of the second electrodes and one of the first electrodes near the conductive line is less than a predetermined value, a shielding portion is formed in the second electrode, and
in a case where a distance between a conductive line near one of the second electrodes and one of the first electrodes near the conductive line is greater than a predetermined value, the shielding portion is not formed in the second electrode.

[C2]
The display device of [C1], wherein
a distance between the shielding portion formed in the second electrode and the shielding portion formed in an adjacent second electrode is less than a predetermined value.

[C3]
The display device of [C1], wherein
a size of the shielding portion formed in the second electrode differs depending on a distance between the conductive line connected to the second electrode and the first electrode provided near the conductive line.

[C4]
The display device of [C1], wherein
an area of a portion in which the shielding portion formed in the second electrode overlaps the first electrode is substantially equal to an area of a portion in which the shielding portion formed in another second electrode overlaps the first electrode.

[C5]
The display device of [C1], wherein
a plurality of common electrodes for displaying an image in the display area are used as the first electrodes.

[C6]
A display device for displaying an image in a display area, the display device comprising:
a plurality of first electrodes overlapping the display area, extending in a first direction, and arranged in a second direction intersecting the first direction;
a plurality of second electrodes overlapping the display area, extending in the second direction, and arranged in the first direction;
a plurality of conductive lines provided along the first electrodes, and connected to the second electrodes, respectively; and
a touch detection driver connected to the conductive lines, and detecting contact or approach of an object with respect to the display area based on capacitance between the first electrodes and the second electrodes, wherein
in a case where a distance between a conductive line near one of the second electrodes and one of the first electrodes near the conductive line is less than a predetermined value, a first shielding portion is formed in the second electrode,
in a case where a distance between a conductive line near one of the second electrodes and one of the first electrodes near the conductive line is greater than a predetermined value, a second shielding portion is formed in the second electrode,
the first shielding portion is formed at a position overlapping the first electrode, and
the second shielding portion is formed at a position which does not overlap the first electrode.

[C7]
A display device for displaying an image in a display area, the display device comprising:
a plurality of first electrodes overlapping the display area, extending in a first direction, and arranged in a second direction intersecting the first direction;
a plurality of second electrodes overlapping the display area, extending in the second direction, and arranged in the first direction;
a plurality of conductive lines provided along the first electrodes, and connected to the second electrodes, respectively; and
a touch detection driver connected to the conductive lines, and detecting contact or approach of an object with respect to the display area based on capacitance between the first electrodes and the second electrodes, wherein
in a case where a distance between a conductive line near one of the second electrodes and one of the first electrodes near the conductive line is less than a predetermined value, a first shielding portion is formed in the second electrode,
in a case where a distance between a conductive line near one of the second electrodes and one of the first electrodes near the conductive line is greater than a predetermined value, a second shielding portion is formed in the second electrode, and an area of a portion in which the second shielding portion overlaps the first electrode is less than an area of a portion in which the first shielding portion overlaps the first electrode.

[C8]

The display device of one of [C1] to [C7], wherein
the display area has a shape different from a rectangular shape.

[C9]

A touch panel comprising:
a plurality of first electrodes overlapping a touch detection area, extending in a first direction, and arranged in a second direction intersecting the first direction;
a plurality of second electrodes overlapping the touch detection area, extending in the second direction, and arranged in the first direction;
a plurality of conductive lines provided along the first electrodes, and connected to the second electrodes, respectively; and
a touch detection driver connected to the conductive lines, and detecting contact or approach of an object with respect to the touch detection area based on capacitance between the first electrodes and the second electrodes, wherein
in a case where a distance between a conductive line near one of the second electrodes and one of the first electrodes near the conductive line is less than a predetermined value, a shielding portion is formed in the second electrode, and
in a case where a distance between a conductive line near one of the second electrodes and one of the first electrodes near the conductive line is greater than a predetermined value, the shielding portion is not formed in the second electrode.

[C10]

The touch panel of [C9], wherein
a distance between the shielding portion formed in the second electrode and the shielding portion formed in an adjacent second electrode is less than a predetermined value.

[C11]

The touch panel of [C9], wherein
a size of the shielding portion formed in the second electrode differs depending on a distance between the conductive line connected to the second electrode and the first electrode provided near the conductive line.

[C12]

The touch panel of [C9], wherein
an area of a portion in which the shielding portion formed in the second electrode overlaps the first electrode is substantially equal to an area of a portion in which the shielding portion formed in another second electrode overlaps the first electrode.

[C13]

A touch panel comprising:
a plurality of first electrodes overlapping a touch detection area, extending in a first direction, and arranged in a second direction intersecting the first direction;
a plurality of second electrodes overlapping the touch detection area, extending in the second direction, and arranged in the first direction;
a plurality of conductive lines provided along the first electrodes, and connected to the second electrodes, respectively; and
a touch detection driver connected to the conductive lines, and detecting contact or approach of an object with respect to the touch detection area based on capacitance between the first electrodes and the second electrodes, wherein
in a case where a distance between a conductive line near one of the second electrodes and one of the first electrodes near the conductive line is less than a predetermined value, a first shielding portion is formed in the second electrode,
in a case where a distance between a conductive line near one of the second electrodes and one of the first electrodes near the conductive line is greater than a predetermined value, a second shielding portion is formed in the second electrode,
the first shielding portion is formed at a position overlapping the first electrode, and
the second shielding portion is formed at a position which does not overlap the first electrode.

[C14]

A display device comprising:
a plurality of first electrodes overlapping a touch detection area, extending in a first direction, and arranged in a second direction intersecting the first direction;
a plurality of second electrodes overlapping the touch detection area, extending in the second direction, and arranged in the first direction;
a plurality of conductive lines provided along the first electrodes, and connected to the second electrodes, respectively; and
a touch detection driver connected to the conductive lines, and detecting contact or approach of an object with respect to the touch detection area based on capacitance between the first electrodes and the second electrodes, wherein
in a case where a distance between a conductive line near one of the second electrodes and one of the first electrodes near the conductive line is less than a predetermined value, a first shielding portion is formed in the second electrode,
in a case where a distance between a conductive line near one of the second electrodes and one of the first electrodes near the conductive line is greater than a predetermined value, a second shielding portion is formed in the second electrode, and
an area of a portion in which the second shielding portion overlaps the first electrode is less than an area of a portion in which the first shielding portion overlaps the first electrode.

[C15]

The display device of one of [C9] to [C14], wherein
the touch detection area has a shape different from a rectangular shape.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An electronic device with touch sensing function comprising:
   a first substrate;
   a first driving electrode extending in a first direction on the first substrate;
   a second driving electrode having a longer length than the first driving electrode on the first substrate;
   a second substrate facing the first substrate;
   a first detecting electrode extending in a second direction on the second substrate and intersecting the first and the second driving electrodes;

a second detecting electrode having a shorter length than the first detecting electrode on the second substrate and intersecting the first and the second driving electrodes;

a shielding portion formed at the end of the first detecting electrode and as a part of the first detecting electrode;

a first conductive line arranged along the first driving electrode and connected to the shielding portion; and a second conductive line arranged along and outside the first conductive line and connected to the second detecting electrode, wherein the shielding portion overlaps the end of the first driving electrode.

2. The electronic device with touch sensing function of claim 1, wherein the shielding portion is a rectangular shape.

3. The electronic device with touch sensing function of claim 1, wherein the second conductive line is longer than the first conductive line.

4. The electrode device with touch sensing function of claim 1, wherein the shape of both the first substrate and the second substrate is a shape of a polygon more than a pentagon.

5. The electrode device with touch sensing function of claim 4, wherein the polygon is a hexagon.

6. An electronic device with touch sensing function comprising:

a first substrate having a shape of a polygon more than a pentagon;

a first driving electrode with a length extending in a first direction on the first substrate;

a second driving electrode with a different length than the first driving electrode arranged in parallel with the first driving electrode on the first substrate;

a second substrate facing the first substrate and having the same shape as the first substrate;

a first detecting electrode with a length extending in a second direction on the second substrate and intersecting the first and the second driving electrodes;

a second detecting electrode with a different length than the first detecting electrode arranged in parallel with the second detecting electrode on the second substrate and intersecting the first and the second driving electrodes;

a shielding portion formed at the end of the first detecting electrode and as a part of the first detecting electrode;

a first conductive line arranged along the first driving electrode and connected to the shielding portion; and a second conductive line arranged along and outside the first conductive line and connected to the second detecting electrode, wherein the shielding portion overlaps the end of the first driving electrode.

7. The electronic device with touch sensing function of claim 6, wherein the shielding portion is a rectangular shape.

8. The electronic device with touch sensing function of claim 6, wherein the second conductive line is longer than the first conductive line.

9. The electronic device with touch sensing function of claim 6, wherein the length of the first driving electrode is shorter than the length of the second driving electrode and the length of the first detecting electrode is longer than the length of the second detecting electrode.

10. The electronic device with touch sensing function of claim 9, wherein the second conductive line is longer than the first conductive line.

11. The electronic device with touch sensing function of claim 10, wherein the shielding portion is a rectangular shape.

12. The electronic device with touch sensing function of claim 6, wherein the polygon is a hexagon, the length of the first driving electrode is shorter than the length of the second driving electrode, and the length of the first detecting electrode is longer than the length of the second detecting electrode.

* * * * *